July 5, 1960   C. B. MORGAN   2,943,706
QUICK ACTING VALVE OPERATING MECHANISM
Filed Feb. 10, 1956   3 Sheets-Sheet 1
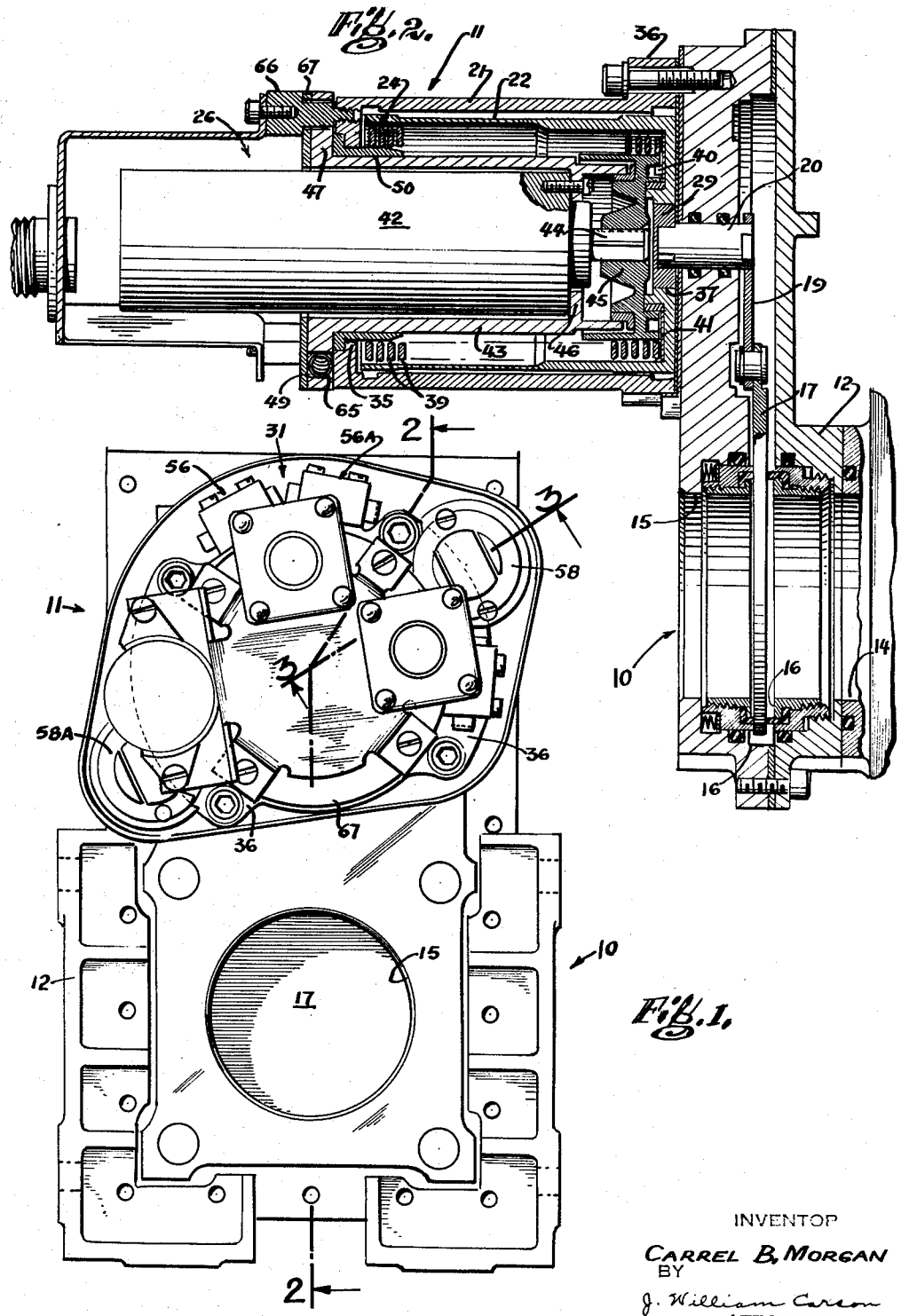
INVENTOR
CARREL B. MORGAN
BY
J. William Carson
ATTORNEY

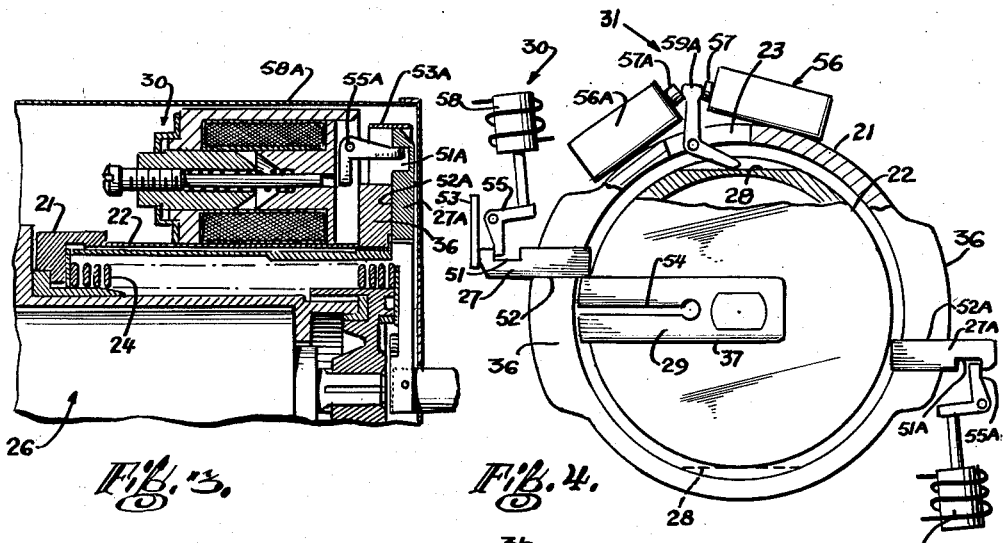
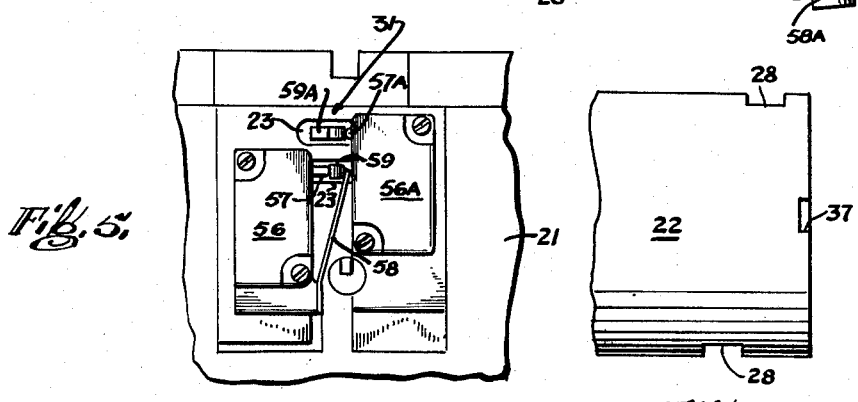
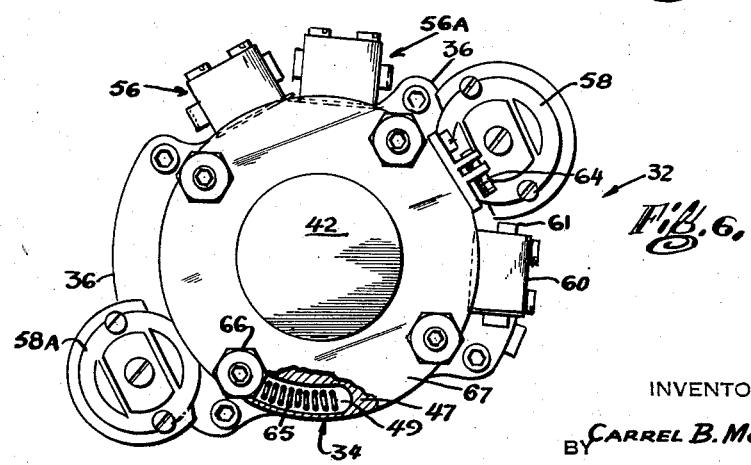

INVENTOR
CARREL B. MORGAN
BY
J. William Carson
ATTORNEY

United States Patent Office 2,943,706
Patented July 5, 1960

1

2,943,706

QUICK ACTING VALVE OPERATING MECHANISM

Carrel B. Morgan, Packanack Lake, N.J., assignor to Specialties Development Corporation, Belleville, N.J., a corporation of New Jersey Filed Feb. 10, 1956, Ser. No. 564,734

13 Claims. (Cl. 185—40)

This invention relates to valves and valve operating mechanisms, and, more particularly, to improvements in electrically operated valves and the mechanism for operating such valves.

In aircraft and marine engine fuel and lubricating systems, it has frequently been found desirable to place valves in the fuel and oil lines as near to the storage tanks as possible so that, in the event of an emergency, such as an opening in the lines, the valves could be closed to minimize the loss of fuel or oil, and to prevent it from spilling on hot surfaces and igniting. Since rapid access to such tanks, and the valves associated therewith, is often impossible because of the location thereof, particularly when the craft is in transit, electrically operated valves were employed wherein a valve member was seated and unseated by the operation of an electric motor controlled from a remote location. Such valves were relatively slow operating and were not satisfactory in applications requiring quick closing valves, for example, in case of a collision or other emergency. To overcome this disadvantage, it has been proposed to employ valves which operate to close quickly by the action of a spring. An electric motor opens such valves while it simultaneously loads the closing spring, wherefore the opening operation is relatively slow and the motor must be relatively large. Another disadvantage of this type of valve lies in the fact that if the valve is accidentally closed in transit, shutting off the fuel or oil supply, it might be impossible to open the same in time to prevent considerable damage, and possibly loss of the craft.

Accordingly, an object of the present invention is to provide an electrically operated valve which overcomes the foregoing difficulties.

Another object is to provide such a mechanism which renders the valve extremely quick closing and quick opening.

Another object is to provide such a valve which remains in its opened or closed position without continuous energization of the actuating means, whereby its position will not change in the event of a power failure.

Another object is to provide such a valve which requires only a small amount of power for its actuation, to open or close the same, and which requires no power to maintain it in either position.

Another object is to provide such a valve which is spring actuated for both the opening and closing operations and in which a predetermined quantity of energy is automatically supplied to and stored by the spring means.

Another object is to provide such a valve wherein sufficient energy is stored by the spring means to enable the same to effect at least one complete cycle of operation before it becomes necessary to replenish the expended energy.

A further object is to provide such a valve which is simple, compact and rugged in construction, economical to manufacture and reliable in its operation.

A still further object is to provide valve operating mechanism for use in connection with such a valve whereby the foregoing objects may be accomplished.

Other and further objects of the invention will be obvious upon an understanding of the illustrative embodiment about to be described or will be indicated in the appended claims, and various advantages not referred to herein will occur to one skilled in the art upon employment of the invention in practice.

In accordance with the invention, the foregoing objects may be accomplished by providing mechanism for operating a valve comprising a body, a shaft mounted in the body, means including spring means for normally storing energy for rotating the shaft, means including a motor for loading the spring means, latch means mounted in the body for rendering the means for rotating the shaft ineffective, means for rendering the latch means ineffective, switch means for normally rendering the motor ineffective, and means for rendering the switch means ineffective and the motor effective to load the spring means when the stored energy therein is partially expended.

A preferred embodiment of the invention has been chosen for purposes of illustration and description, and is shown in the accompanying drawings forming a part of the specification, wherein:

Fig. 1 is an end elevational view of a valve operating mechanism in accordance with the present invention and a typical gate valve housing;

Fig. 2 is a sectional view taken along the line 2—2 on Fig. 1;

Fig. 3 is a fragmentary sectional view taken along the line 3—3 on Fig. 1;

Fig. 4 is a fragmentary, schematic end view of the valve operating mechanism with the valve housing removed, illustrating the latch means and means for rendering the same ineffective;

Fig. 5 is a fragmentary top view taken on Fig. 1, illustrating portions of the mechanism for controlling the latch means;

Fig. 6 is a fragmentary end view of the valve operating mechanism, partially in section, as viewed from the end opposite the valve housing, and illustrating the motor switch means and control means therefor;

Fig. 9 is a fragmentary left side view of an element of the valve operating mechanism shown in Fig. 4.

Figure 7:
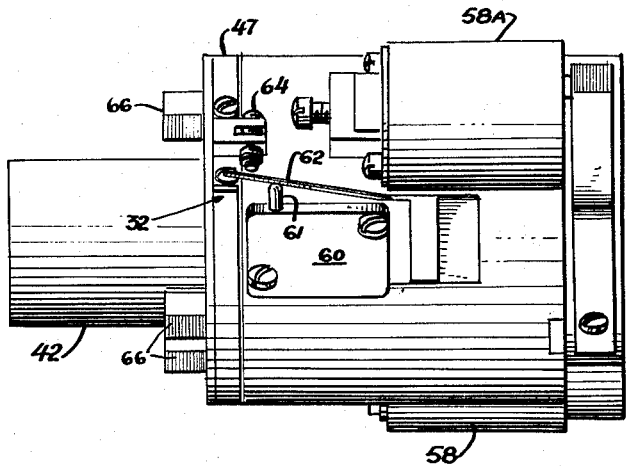
Fig. 7 is a top plan view of the valve operating mechanism.

Referring to the drawings in detail, and more particularly to Figs. 1 and 2 thereof, there is shown a gate valve 10 and a valve operating mechanism 11 for operating the valve.

The valve 10 includes a housing 12 formed with an inlet 14 and an outlet 15, valve seats 16 between the inlet and outlet, a gate member 17 adapted to engage the seats, a crank arm 19 pivotally connected to the gate member and a rotatable shaft 20, extending through the housing and connected to the crank arm for effecting operation of the gate member.

The valve operating mechanism 11 comprises a body 21 axially aligned with the shaft 20, a spring housing 22 in the body, spring means 24 in the spring housing for storing energy for rotating the shaft, motor means 26 mounted in the body for loading the spring means, a valve opening latch member 27 and a valve closing latch member 27A (Fig. 4) mounted on the body, and an impact arm 29 mounted on the shaft 20 and connected to the spring housing 22 for individually engaging the latch members to prevent rotation of the shaft. As shown in Figs. 3, 5, 6 and 7, electromagnetic latch member actuating means 30 for effecting disengagement of the latch members and the impact arm, means 31 on the body for controlling the electromagnetic means, switch means 32 on the body for controlling the motor, and torque sensing means 34 for effecting operation of the motor controlling switch also are provided.

The body 21 is a tubular member open at both ends and is formed with an internal, stepped flange 35 at one end thereof. The body is provided with a plurality of external flanges 36 (only one being shown) at the other end by which it is bolted to the valve housing 12; and a pair of parallel, circumferential slots 23 (Figs. 4 and 5) are formed in the body for a purpose to be described.

As shown in Figs. 2 and 4, the spring housing 22 is generally cup-shaped and has an overall diameter whereby it fits freely within the body 21. The bottom of the spring housing, disposed adjacent the housing 12, is flat and is formed with a radial groove 37 extending from the edge of the bottom slightly beyond the center thereof for receiving the impact arm 29. The spring housing 22 also has a pair of circumferential flats 28 (Fig. 4) on diametrically opposite sides of the outer surface thereof and staggered with respect to each other along the longitudinal axis of the housing (as shown in Fig. 9) and each axially aligned with one of the slots 23 in the body 21 so that one flat 28 registers with one slot 23 when the spring housing 22 is in one position and the other flat 28 registers with the other slot 23 when the housing 22 is rotated 180° from the first position.

The spring means 24 comprises a pair of helical torsion springs 39 longitudinally interwound and each having conventional tabs 40 at both ends thereof (only one of which is shown) whereby outboard ends of the springs are anchored at diametrically opposite points in the free end (left end as shown in Figure 2) of the spring housing 22 by suitable slots provided for that purpose. The other ends of the springs 39 are similarly anchored to the motor means 26. A suitable basket 41 may be provided abutting the spring housing bottom to serve as a seat for the spring means and to minimize friction losses.

The motor means 26 consists of a motor assembly 42 including a conventional electric motor and a high ratio, torque increasing, gear train having an output shaft 44, a hub 45 secured to the shaft and a motor housing 43 for containing the motor assembly 42. The hub 45 is formed with external diametrically opposite slots to receive the spring tabs 40 adjacent the spring housing bottom; the motor housing is a generally tubular member constructed to extend into the zone confined by the spring means 24 and having an internal flange 46 adjacent its inner end bolted to the motor. This housing is also formed with an external flange 47 (Figs. 2 and 6) at its outer end having four arcuate, circumferentially spaced slots 49 therein. A ring 50 surrounds the motor housing 43 adjacent the flange 47 and has an external annular flange thereon which interfits with the stepped flange 35 in the body 21 to support the motor housing at its free end and provide a low friction contact between the body 21 and the motor means 26.

As shown in Figs. 3 and 4, the latch members 27 and 27A are elongate rods each having a rectangular cross-section and a transverse groove 51 and 51A, respectively, adjacent an end thereof. One of these members is slidably disposed in each of a pair of diametrically opposite grooves 52 and 52A formed in the flange 36 of the body 21, and a pair of flat springs (shown in Fig. 4) and 53A (shown in Fig. 3, but not in Fig. 4), one of which is secured to each flange 36, engages the exterior end of each rod 27, 27a and normally maintains the same in a position whereby its inner end is adjacent the spring housing 22.

The impact arm 29 (Fig. 4) is a generally flat member mounted at one end on the shaft 20 and extending radially therefrom in the groove 37 in the bottom of the spring housing 22 a sufficient distance so that it extends beyond the edge thereof. The arm may be formed with a central longitudinal slot 54 therein extending inwardly from the free end thereof to assist in the absorption of impact stresses. As has been mentioned hereinbefore, the free end of the impact arm is adapted to individually engage the latch members 27 and 27A to prevent rotation of the shaft 20.

The electromagnetic means 30 includes an opening solenoid 58 and an identical closing solenoid 58A supported on the body, each provided with a pivotally mounted L-shaped rocker 55 and 55A, respectively, having one leg thereof extending into the grooves 51 and 51A, respectively, of one of the latch members 27 and 27A, respectively. The other leg of each of the rockers 55 and 55A is disposed adjacent its respective solenoid armature whereby the latter will impinge against the adjacent rocker leg, upon energization of the solenoid, causing the respective rocker to rock about its pivot to move its respective latch member in a direction away from the shaft 20 against the influence of the respective springs 53 and 53A.

As shown in Figs. 4 and 5, the means 31 on the body for controlling the electromagnetic means include an opening electric switch 56 adjacent one of the slots 23 and closing switch 56A adjacent the other slot 23. Each of the switches has a spring biased plunger 57 and 57A, respectively, the switch 56 being closed when its plunger 57 is moved out under the action of its biasing spring, and the switch 56A being closed when its plunger is moved in against the action of its biasing spring. The opening switch is connected in the circuit of the opening solenoid to control the same and the closing switch similarly controls the closing solenoid. L-shaped rockers 59 and 59A, respectively, for each switch are each pivotally mounted in one of the slots 23. The rockers are so mounted that one leg thereof is adjacent a switch plunger 57—57A and the other leg thereof engages the surface of the spring housing 22. A spring 58 (Fig. 5) acts on the outer leg of the rocker 59 to urge the same against the plunger 57, however, when the inner leg of rocker 59 engages the outer periphery of the housing 22, the rocker is rotated to oppose the action of the spring 58 and the plunger 57 is in its outward position and the switch 56 is closed. The switch 56A is also closed when its rocker 59A engages the outer periphery of the housing 22 since the rocker is then rotated to move the plunger 57A inwardly. When a flat 28 on the spring housing surface registers with a slot 23, the rocker mounted in that slot is rocked under the influence of either the spring biased plunger 57A or the spring 58 to enable the switch to open.

The switch means 32 for controlling the motor is best illustrated in Figs. 6 and 7 and includes a normally closed electric switch 60 mounted on the body 21 and having a spring biased plunger 61, a flat spring 62 also mounted on the body and overlying the plunger 61, and an actuating rod 64 adjustably mounted on the surface of the motor housing flange 47 adapted to depress the spring 62 to cause the plunger 61 to actuate the switch 60 as will be more fully discussed hereinafter.

The torque sensing means 34 for effecting operation of the motor controlling switch 60 includes the four arcuate slots 49 in the motor housing flange 47, a resilient element such as a spring 65 in each such slot, and a bolt 66 extending through each such slot and into the body flange 35 (Fig. 2) and serving to secure a cover plate 67 over the end of the motor housing. These springs are disposed in the slots in a manner whereby one end of each spring is seated against an end of its respective slot and the other end of each spring abuts the bolt passing through that slot.

Figure 8:
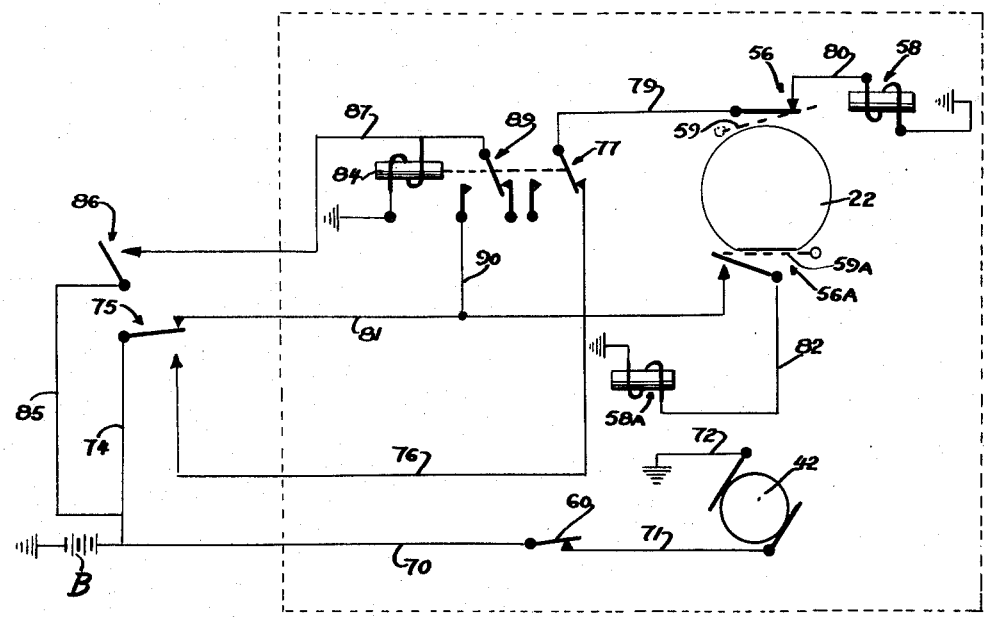
Fig. 8 is a circuit diagram illustrating the electrical connections for supplying power to the various valve operating controls.

In Fig. 8, a motor circuit is shown which may consist of a battery B, one side of which is grounded, a conductor 70, the switch 60, conductor 71, the motor 42 and conductor 72 which goes to ground.

The opening solenoid 58 has one side grounded and is connected to the battery B through a conductor 74, a manually operable, single pole, double throw switch 75, a conductor 76, a normally closed switch 77, a conductor 79, the switch 56 and a conductor 80.

The closing solenoid 58A, also has one side grounded and is connected to the battery B through the conductor 74, the switch 75, a conductor 81, the switch 56A and a conductor 82.

It will be noted that the opening switch 56 and the closing switch 56A are operated by the rockers 59 which are themselves actuated by rotation of the spring housing 22. For convenience, the switches and rockers are shown diametrically opposite each other in this view, instead of adjacent each other as shown in Figs. 5 and 6, wherefore only one flat is shown on the spring housing to rock both rockers instead of the two diametrically opposite flats described hereinbefore.

There is also provided a solenoid 84 having one side grounded, which is connected to the battery B through a conductor 85, a normally open, crash impulse actuable switch 86 and a conductor 87. The conductor 87 is also connected to the conductor 81 through a normally open switch 89 and a conductor 90, and the solenoid 84 is disposed with respect to the normally closed switches 77 and 89 so that, when energized, it effects opening thereof.

When the valve operating mechanism is initially connected into the circuit shown in Fig. 8, the switch 60 is closed completing the circuit from the battery to the motor 42 through the conductor 70, the switch 60, the conductor 71 and the grounding conductor 72. The motor is therefore energized causing rotation of the shaft 44, the hub 45 and the spring means 24 which in turn causes the rotation of the spring housing 22, the impact arm 29, the shaft 20 and the crank arm 19 to move the gate member 17 of the valve. The housing 22 rotates until the impact arm abuts one of the latch members 27 or 27A (Fig. 4) thereby preventing further rotation of the spring means housing 22 so that continued rotation of the motor has no effect on the position of the valve, but causes the hub to torque or load the springs 39 through the tabs 40. As the spring load increases, the reaction of the force required to effect such increased loading causes the motor and its housing 43 to rotate with respect to the body 21 in a direction to compress the springs 65 in the housing slots 49 provided in the housing flange 47 (Figs. 2 and 6) against the stationary bolts 66, the ring 50 serving as a friction reducing bearing between the motor housing and the body flange 35. The switch 60 and the spring 62 mounted on the body 21 are stationary and the counter rotation of the motor and housing 43 continues until the actuating rod 64 on the exterior surface of the motor housing flange 47 contacts and depresses the spring 62 which in turn depresses the plunger 61 to open the switch 60 and deenergize the motor. The ratio of the gear train in the assembly 42 is such that the loading on the springs 39 is insufficient to overcome the friction in the motor and rotate the motor backwards. The position of the switch 75 controls which of the latch members 27 or 27A is extended to stop the rotation of the housing 22. When the switch 75 is in the valve closing position, as shown in Fig. 8, the solenoid 58A is energized holding the valve closing latch member 27A in the retracted position, and the solenoid 58 is energized allowing the spring 53 to place the valve opening latch member 27 in the path of the impact arm 29. When the impact arm abuts the opening latch member 27, the valve is closed and one of the flats on the spring housing is positioned in registry with one of the slots 23 so that the opening switch 56 is closed and the closing switch 56A is open.

To open the valve, the switch 75 is manually thrown into the valve opening position, whereby a circuit is completed from the battery B through the conductor 74, the switch 75, the conductor 76, the switch 77, the conductor 79, the valve opening solenoid controlling switch 56, the conductor 80, and the valve opening solenoid 58 and to ground. As will be seen in Figs. 3 and 4, energization of the opening solenoid 58 causes its armature to impinge upon one leg of its solenoid rocker 55 to rock the same and move the valve opening latch member 27 out of contact with the impact arm 29 against the influence of the spring 53. Such movement of the valve opening latch member enables the spring housing and the impact arm to rotate under the influence of the springs 39 until the impact arm strikes the valve closing latch member diametrically opposite the valve opening latch member. Rotation of the impact arm through 180° necessarily causes rotation of the shaft 20 and the crank arm 19 through the same angle to lift the gate member 17 and open the valve. Similarly, rotation of the spring housing 22 through 180° moves the flats 28 thereon through the same angle causing reversal of the condition of the switches 56 and 56A so that the valve opening switch 56 opens deenergizing the valve opening solenoid and the valve closing switch 56A closes, placing the valve closing solenoid in condition to be energized upon movement of the switch 75 into the valve closing position. Upon deenergization of the valve opening solenoid, its respective spring 53 returns the latch member 27 to its original position in the path of the impact arm.

It will be noted that as soon as the tension in the springs 39 begins to decrease, the reaction thereto also decreases allowing the torque sensing springs 65 in the housing slots 49 to effect rotation of the motor and its housing in a direction to move the actuating rod 64 away from the spring 62 allowing the switch 60 to close and complete the motor circuit. Completion of this circuit again reloads the springs 39 as described heretofore so that these springs are automatically maintained in operative condition. When fully loaded, it is preferred that the springs store sufficient energy to complete at least one complete cycle of operation without reloading so that the valve may still be operated in the event of damage to the motor or its circuit.

The valve may be closed manually or as a result of a crash. If it is desired to close the valve manually, the switch 75 is moved to the closed position (Fig. 8) completing a circuit from the battery B through the conductor 74, the switch 75, the conductor 81, the closing solenoid controlling switch 56A, the conductor 82, and the closing solenoid 58A to ground. Energization of the closing solenoid causes movement of the latch member 27A out of contact with the impact arm in the same manner as was described with respect to energization of the opening solenoid. The impact arm, the spring housing and the shaft 20 rotate 180° to close the valve and are arrested by the opening latch member 27, completing a cycle of operation. The motor 26 automatically reloads the springs 39 in the manner described.

In the event of a crash, the crash actuated switch 86, biased in the open position, is closed by the impact, for example, completing a circuit from the battery B through the conductor 85, the switch 86, the conductor 87, and the relay 84 to ground. Energization of the relay opens the switch 77 to render the opening circuit ineffective, and closes the switch 89 to extend a circuit from the conductor 85 to the closing solenoid 58A through the switch 86, the conductors 87 and 81, the switch 56A and the conductor 82.

It will be noted that when the valve operating mechanism is in flight condition, that is, with the switch 75 in open position and the valve open, while any false impulse or signal simulating a crash signal in the crash impulse circuit which closes the crash actuated switch 86 will effect closing of the valve, the same will automatically open as soon as the crash switch reopens thereby deenergizing the relay 84. Such a contingency demonstrates the desirability of a valve which is quick opening, as well as quick closing.

From the foregoing description it will be seen that the present invention provides a quick acting valve operating mechanism wherein the valve is maintained in its opened or closed position without continuous actuation of the actuating means so that the same will retain its position in the event of a power failure and wherein only a small amount of power is required for its actuation to open or close the same. It will also be noted that the valve is spring actuated for both the opening and closing operations and that a predetermined quantity of energy is automatically supplied to and stored by the spring means, to enable the same to effect at least one complete cycle of operation without reloading. The present mechanism is simple, compact and rugged in construction and is economical to manufacture and reliable in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Mechanism for operating a valve comprising a body, a shaft mounted in said body, means including spring means for normally storing energy for rotating said shaft, means including a motor for loading said spring means, latch means mounted in said body for rendering said means for rotating said shaft ineffective, means for rendering said latch means ineffective and means responsive to the degree of loading of said spring means for rendering said motor ineffective when said spring means is loaded and for rendering, said motor effective to load said spring means when the stored energy therein is partially expended.

2. Mechanism according to claim 1, wherein said last mentioned means include a motor housing rotatable in one direction by the torque developed by said motor, torque sensing means associated with said housing for urging rotation of said housing in the opposite direction upon release of energy from said spring means, switch means for controlling said motor and switch actuating means mounted on said housing to actuate said switch means.

3. Mechanism according to claim 2, wherein said torque sensing means include a circumferential slot in said housing, a pin mounted in said body and extending into said slot, and a compression spring in said slot compressible between said pin and one end of said slot upon rotation of said housing by said torque developed by said motor.

4. Mechanism for operating a valve comprising a body, a shaft mounted in said body, means connected to said shaft including spring means for normally storing energy for rotating said shaft, means connected to said spring means including a motor for loading said spring means, said motor being connected to said shaft only through said spring means, latch means mounted in said body, means mounted on said shaft for rotation therewith adapted to engage said latch means to render said means for rotating said shaft ineffective, means for rendering said latch means ineffective, and means for rendering said motor ineffective when said spring means is loaded and for rendering said motor effective to load said spring means when the stored energy therein is partially expended.

5. Mechanism for operating a valve comprising a body, a shaft mounted in said body, means including spring means for normally storing energy for rotating said shaft, means including a motor for loading said spring means, a plurality of latch members slidably mounted in said body, arm means mounted on said shaft for rotation therewith adapted to individually engage said latch members to render said means for rotating said shaft ineffective, means for sliding each of said latch members in a direction to cause the same to disengage said arm means to allow said shaft to rotate, means for returning said latch members to arm engaging position, and means responsive to the degree of loading of said spring means for rendering said motor ineffective when said spring means is loaded and for rendering said motor effective to load said spring means when the stored energy therein is partially expended.

6. Mechanism according to claim 5 wherein said arm is mounted at one end on said shaft to extend radially outwardly therefrom and is formed with a radial slot extending inwardly from the free end thereof.

7. Mechanism for operating a valve comprising a body, a shaft mounted in said body, means connected to said shaft including spring means for normally storing energy for rotating said shaft, means connected to said spring means including a motor for loading said spring means, said motor being connected to said shaft only through said spring means, latch means mounted in said body for rendering said means for rotating said shaft ineffective, means for rendering said latch means ineffective, and torque responsive means for normally rendering said motor ineffective, in responsive to the loading of said spring means and for rendering said motor effective to load said spring means when the stored energy therein is partially expended.

8. Mechanism for operating a valve comprising a body, a shaft mounted in said body, means including a spring housing connected to said shaft and having a cylindrical surface provided with a flat zone, and spring means in said housing for normally storing energy for rotating said housing and said shaft, means including a motor for loading said spring means, latch means mounted in said body for rendering said means for rotating said shaft ineffective, electromagnetic means for rendering said latch means ineffective, switch means mounted on said body for deenergizing said electromagnetic means, rocker means pivotally mounted on said body engageable by said flat zone to render said switch means effective, and means responsive to the degree of loading of said spring means for rendering said motor ineffective when said spring means is loaded and for rendering said motor effective to load said spring means when the stored energy therein is partially expended.

9. Mechanism for operating a valve comprising a body; a shaft mounted in said body; means including spring means for normally storing energy for rotating said shaft; means including a motor for loading said spring means; latch means mounted in said body; means mounted on said shaft for rotation therewith adapted to engage said latch means to render said means for rotating said shaft ineffective; means for rendering said latch means ineffective; switch means for normally rendering said motor ineffective; and means including a motor housing rotatable in one direction by the torque developed by said motor, torque sensing means associated with said housing for urging rotation of said housing in the opposite direction upon release of energy from said spring means, and switch actuating means mounted on said housing to operate said switch means to render said motor effective to load said spring means when the stored energy therein is partially expended.

10. Mechanism according to claim 9, wherein said torque sensing means include a circumferential slot in said housing, a pin mounted in said body and extending into said slot, and a compression spring in said slot compressible between said pin and one end of said slot upon rotation of said housing by said torque developed by said motor.

11. Mechanism for operating a valve comprising a body; a shaft mounted in said body, means including spring means for normally storing energy for rotating said shaft; means including a motor for loading said spring means; a plurality of circumferentially spaced latch members slidably mounted in said body; arm means mounted on said shaft for rotation therewith adapted to individually engage said latch members to render said means for rotating said shaft ineffective; means for sliding each of said latch members in a direction to cause the same to disengage said arm means to allow said shaft to rotate; means for returning said latch members to arm engaging position; switch means for normally rendering said motor ineffective; and means including a motor housing rotatable in one direction by the torque developed by said motor, torque sensing means associated with said housing for urging rotation of said housing in the opposite direction upon release of energy from said spring means, and switch actuating means mounted on said housing to operate said switch means to render said motor effective to load said spring means when the stored energy therein is partially expended.

12. Mechanism for operating a valve comprising a body, a shaft mounted in said body, a spring housing in said body having a cylindrical surface provided with a plurality of flat zones, and spring means in said housing for normally storing energy for rotating said housing and said shaft, means including a motor for loading said spring means, a plurality of latch members slidably mounted in said body, arm means mounted on said shaft for rotation therewith adapted to individually engage said latch members to render said means for rotating said shaft ineffective, means including electromagnetic means for sliding each of said latch members in a direction to cause the same to disengage said arm means to allow said shaft to rotate, means for returning said latch members to arm engaging position, switch means mounted on said body for deenergizing said electromagnetic means, a plurality of rockers pivotally mounted on said body each engageable by a flat zone of said spring housing surface to render one of said switch means effective, and means responsive to the degree of loading of said spring means for rendering said motor ineffective when said spring means is loaded and for rendering said motor effective to load said spring means when the stored energy therein is partially expended.

13. Mechanism according to claim 12 wherein a pair of latch members are mounted in said body diametrically opposite each other with respect to said spring housing one of which is adapted to be engaged by arm means to arrest the same when said shaft is in one position, the other of which is adapted to be engaged by said arm means to arrest the same when said shaft is in another position and wherein the number of said flats and said rockers corresponds to the number of said latch members.

References Cited in the file of this patent

UNITED STATES PATENTS

| | | |
|---|---|---|
| 1,137,401 | Haymond | Apr. 27, 1915 |
| 1,217,843 | Shelton | Feb. 27, 1917 |
| 1,891,101 | Count | Dec. 13, 1932 |
| 2,338,305 | Simmon | Jan. 4, 1944 |
| 2,591,216 | Thompson | Apr. 1, 1952 |
| 2,738,033 | Towle | Mar. 13, 1956 |